Patented Oct. 23, 1934

1,977,987

UNITED STATES PATENT OFFICE 1,977,987

PROCESS OF MAKING AND TESTING TUBE JOINTS

Thomas A. Corby, Poughkeepsie, N. Y.

Application December 2, 1929, Serial No. 410,959

3 Claims. (Cl. 113—112)

My invention relates to joints between pipes or tubes to make a long, continuous, fluid-tight conductor for gases or liquids. The invention relates not only to the joint itself, but also to the process of making the joint and testing its fluid-tightness.

The object of the invention is to provide a fluid-tight joint between tubes or pipes and also to so construct the joint that it may be immediately tested and, if found defective, may be immediately cut out and the ends again joined.

My improved joint, made and tested in accordance with my invention, is particularly valuable for under-water or other conductors which, after they are in place, will be inaccessible for examination or repair.

Figure 1:
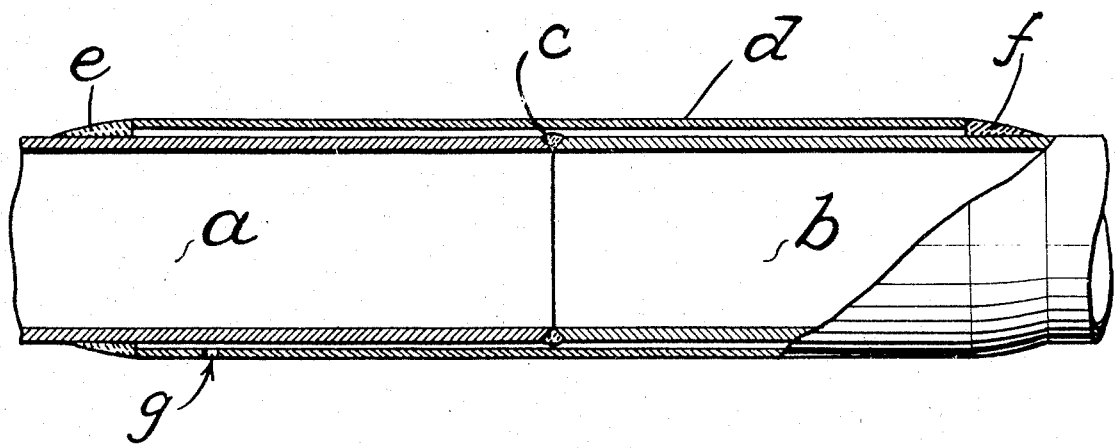
Figure 2:
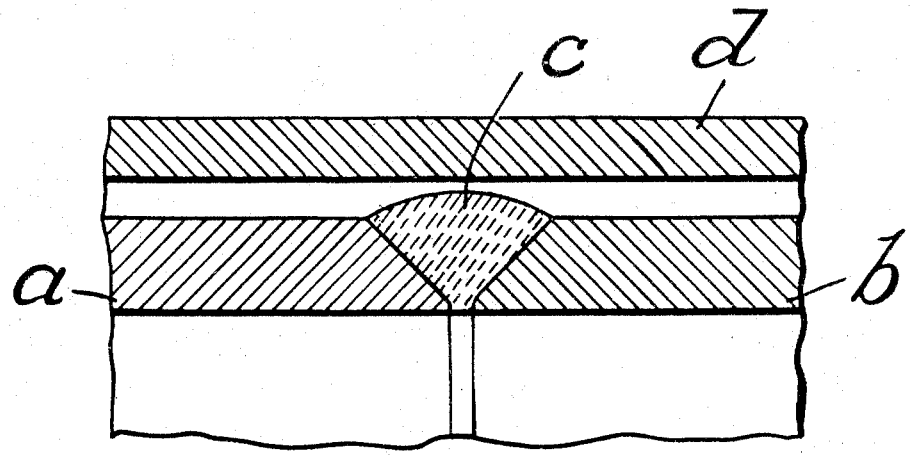

In the drawing, which shows a joint made in accordance with my invention, Fig. 1 is a longitudinal sectional view of the complete joint, and Fig. 2 is an enlarged sectional view of the weld between adjacent tubes.

*a* and *b* are ends of tubes which were to be joined. *c* is a weld connecting the two tubes together. *d* is a short section of a larger tube or sleeve which is slipped over the joint and welded to the tubes at *e* and *f*. At *g* there is provided in sleeve *d* a small hole through which air or other gas may be forced in at high pressure to test the joint.

In joining pipes or tubes according to my invention, the tubes *a* and *b* are first welded together in the usual manner as shown at *c*. This weld is made with particular care because it will be afterward inaccessible. The sleeve *d* is then slipped over the joint and welded to the main tubes as shown at *e* and *f*. The internal diameter of the sleeve *d* should be somewhat greater than the external diameter of the main tubes so as to provide a narrow annular space surrounding the main tubes. Through a small hole *g* gas is forced to fill this space at high pressure. After the space is filled the control valve is closed and a pressure gauge in communication with the space is watched. If the joint is tight at all three welds the pressure will stay up for a long time. If there is any leak it will drop rapidly. When the pressure drops during the test of any weld, soap suds may be spread around the outer joints and any bubble formation will indicate the location of any defect, which can then be easily corrected. If, when there are no defects in the outer welds, the pressure does not stay up, it is proof that the inner weld is not tight. The tubes are then cut off outside of the outer welds and a new joint made between the new ends.

Tubes and pipes joined in the way described and with every joint given an individual test immediately after its completion may be submerged in a river bottom or other inaccessible place with every assurance of long continued service without leaks.

Though I have described tests of joints as being made by filling the annular space with gas under pressure, which I have found to be particularly efficacious for the purpose, it is obvious that any fluid capable of being pumped against high pressure may be substituted for the gas without departing from the spirit of my invention.

Having now fully described my invention, what I claim and desire to protect by Letters Patent is:

1. The process of uniting tubes which comprises welding together the opposing ends of the tubes, enclosing the joined ends of the tubes in a tubular sleeve which overlaps the weld and whose internal diameter is greater than the external diameter of the tubes, and welding the ends of the sleeve to the respective tubes so as to provide a narrow annular chamber surrounding the tubes and adapted to receive fluid under pressure.

2. The process of uniting tubes and testing the tightness of the joints which comprises welding together the opposing ends of the tubes, enclosing the joined ends of the tubes in a tubular sleeve which overlaps the weld and whose internal diameter is greater than the external diameter of the tubes, welding the ends of the sleeve to the respective tubes and thereby providing a narrow annular chamber surrounding the tubes, filling said chamber with fluid under pressure, closing the fluid inlet and observing the rate of fall of pressure.

3. The process of uniting tubes and testing the tightness of the joints which comprises welding together the opposing ends of the tubes, enclosing the joined ends of the tubes in a tubular sleeve which overlaps the weld and whose internal diameter is greater than the external diameter of the tubes, welding the ends of the sleeve to the respective tubes and thereby providing a narrow annular chamber surrounding the tubes, filling said chamber with fluid under pressure, closing the fluid inlet and observing the rate of fall of pressure, thereby determining whether the welds between the sleeve and the tubes are fluid-tight and, if found not to be fluid-tight, making them so, and renewing said high pressure fluid test and observation thereof to determine the tightness of the weld between the opposing ends of the tubes.

THOMAS A. CORBY.